(12) United States Patent
Kino et al.

(10) Patent No.: US 8,403,551 B2
(45) Date of Patent: Mar. 26, 2013

(54) LIGHTING DEVICE

(75) Inventors: Norihito Kino, Aichi-ken (JP); Satoshi Inagaki, Aichi-ken (JP)

(73) Assignee: Toyoda Gosei Co., Ltd., Kiyosu-shi, Aichi-ken (JP)

( * ) Notice: Subject to any disclaimer, the term of this patent is extended or adjusted under 35 U.S.C. 154(b) by 645 days.

(21) Appl. No.: 12/588,834

(22) Filed: Oct. 29, 2009

(65) Prior Publication Data

US 2010/0165661 A1 Jul. 1, 2010

(30) Foreign Application Priority Data

Dec. 25, 2008 (JP) .................................. 2008-331448

(51) Int. Cl.
  *F21V 7/04* (2006.01)
(52) U.S. Cl. ........ 362/609; 362/488; 362/490; 362/509; 362/511; 362/514; 362/608; 362/612; 362/613; 200/317
(58) Field of Classification Search .................. 362/488, 362/490, 509, 511, 514, 608, 609, 612, 615; 200/313–317
See application file for complete search history.

(56) References Cited

U.S. PATENT DOCUMENTS

| | | | | |
|---|---|---|---|---|
| 4,163,883 A * | 8/1979 | Boulanger | .................... | 200/314 |
| 4,385,221 A * | 5/1983 | Dorfler | .................... | 200/314 |
| 4,772,769 A * | 9/1988 | Shumate | .................... | 200/314 |
| 7,002,087 B2 * | 2/2006 | Miyako et al. | ................ | 200/310 |
| 7,592,561 B2 * | 9/2009 | Nishiyama et al. | ........... | 200/313 |
| 8,052,318 B2 * | 11/2011 | Lee et al. | ....................... | 362/617 |
| 2002/0034070 A1 * | 3/2002 | Kumagai | ........................ | 362/26 |
| 2005/0052860 A1 * | 3/2005 | Tsai | ................................ | 362/97 |
| 2007/0189027 A1 * | 8/2007 | Sakakibara | ................... | 362/490 |
| 2009/0090605 A1 * | 4/2009 | Arione et al. | ................. | 200/314 |

FOREIGN PATENT DOCUMENTS

| | | | |
|---|---|---|---|
| JP | 04208564 A | * | 7/1992 |
| JP | 2000-127847 | | 5/2000 |
| JP | 2004-322858 | | 11/2004 |
| JP | 2006-196270 | | 7/2006 |
| JP | 2007-184174 | | 7/2007 |

* cited by examiner

*Primary Examiner* — Diane Lee
*Assistant Examiner* — Mary McManmon
(74) *Attorney, Agent, or Firm* — McGinn IP Law Group, PLLC

(57) ABSTRACT

A lighting device includes: a light guide plate having a light incident part in an end face and a light radiation part in a flat plate surface; a light source part opposed to the light incident part; a light shield member with which an area near the light incident part on the flat plate surface of the light guide plate is covered; and a switch part including a switch main body, a switch knob and a pressing member connected to the switch knob to press the switch main body by pressing down the switch knob. An end part of the switch knob opposed to a center of the flat plate surface of the light guide plate is located on the light shield member, and the end face of the light guide plate is located between a first virtual line passing the end part of the switch knob and perpendicular to the flat plate surface of the light guide plate and a second virtual line passing the center of the switch main body and perpendicular to the flat plate surface of the light guide plate.

19 Claims, 6 Drawing Sheets

LIGHTING DEVICE

BACKGROUND OF THE INVENTION

1. Field of the Invention

The present invention relates to an improvement of a lighting device used in an interior of a vehicle.

2. Description of the Related Art

There is a lighting device for an interior of a vehicle that emits light from a surface of a light guide plate to use it as a light source. For instance, in a structure disclosed in patent literature 1, a plurality of LED lamps are arranged so as to be opposed to one end face of the light guide plate to make the lights of the LED lamps incident on the light guide plate and take out the lights from a flat plate surface and emit the lights on the surface. The lighting state is controlled by a switch arranged on the interior side of the vehicle. In such a structure, an area near the LED lamps of a light emitting part excessively emits the light with high luminance, so that unevenness in luminance is outstanding. In order to prevent this phenomenon, for instance, in a structure disclosed in patent literature 2, an edge of a light emitting part side of a light guide plate (especially, a part near an incident part) is covered with a light shield sheet to prevent light from being radiated from the part near the incident part and cancel the unevenness in luminance. As the switch for controlling the lighting state of the above-described lighting device for the interior of the vehicle, a push type switch is widely used. As examples of the push type switch, patent literatures 3 and 4 are exemplified.

Patent Literature 1: JP-A-2004-322858
Patent Literature 2: JP-A-2000-127847
Patent Literature 3: JP-A-2006-196270
Patent Literature 4: JP-A-2007-184174

In the structure of the patent literature 1, since the switch is provided at a position separated from a light emitting part by considering a space in which the LED lamps are arranged, dullness is given to an observer and an outward appearance is not good. Further, in the structure disclosed in the patent literature 2, since the light shield sheet is provided, the switch is provided at a position more separated from a light emitting part. As a result, the dullness is more increased and the outward appearance is worse. In order to eliminate such dullness and improve the outward appearance, the switch may be provided at a part near the light emitting part. However, when the structure of the switch disclosed in the patent literatures 3 and 4 is directly applied, the device undesirably has its thickness increased and is enlarged.

SUMMARY OF THE INVENTION

Thus, it is an object of the present invention to provide a structure of a lighting device for an interior of a vehicle that is thin and good in its outward appearance and has little unevenness in luminance and does not give dullness to an observer.

In order to achieve the object, a first aspect of the of this invention comprises a light guide plate having a light incident part in an end face and a light radiation part in a flat plate surface, a light source part opposed to the light incident part, a light shield member covering an area near the light incident part on the flat plate surface of the light guide plate; and a switch part including a switch main body, a switch knob and a pressing member connected to the switch knob to press the switch main body by pressing down the switch knob; wherein an end part of the switch knob opposed to a center of the flat plate surface of the light guide plate is located on the light shield member; and the end face of the light guide plate is located between a first virtual line passing the end part of the switch knob and perpendicular to the flat plate surface of the light guide plate and a second virtual line passing the center of the switch main body and perpendicular to the flat plate surface of the light guide plate.

In the lighting device of the present invention, since the end part of the switch knob opposed to a center of the flat plate surface of the light guide plate is located on the light shield member, a part of the area near the light incident part of the light shied member is covered with the end part. Thus, a distance between the switch knob and a light emitting part is shorter than that in a usual device. Therefore, dullness is not given to an observer to improve design characteristics. On the other hand, the end face of the light guide plate is located between a first virtual line passing the end part of the switch knob and perpendicular to the flat plate surface of the light guide plate and a second virtual line passing the center of the switch main body and perpendicular to the flat plate surface of the light guide plate. Namely, the switch main body is not arranged on the light guide plate and the light shield member, but outside the light guide plate. Thus, an entire part of the switch part may be formed to be thinner than a case that the entire part of the switch part is arranged on the light shied member (that is, on the light guide plate). Further, since the light shield member is provided in the vicinity of the incident part so that the part near the incident part to which a large quantity of light reaches is not used as the light emitting part, little unevenness in luminance is obtained as a whole.

DESCRIPTION OF THE PREFERRED EMBODIMENTS

Figure 1:
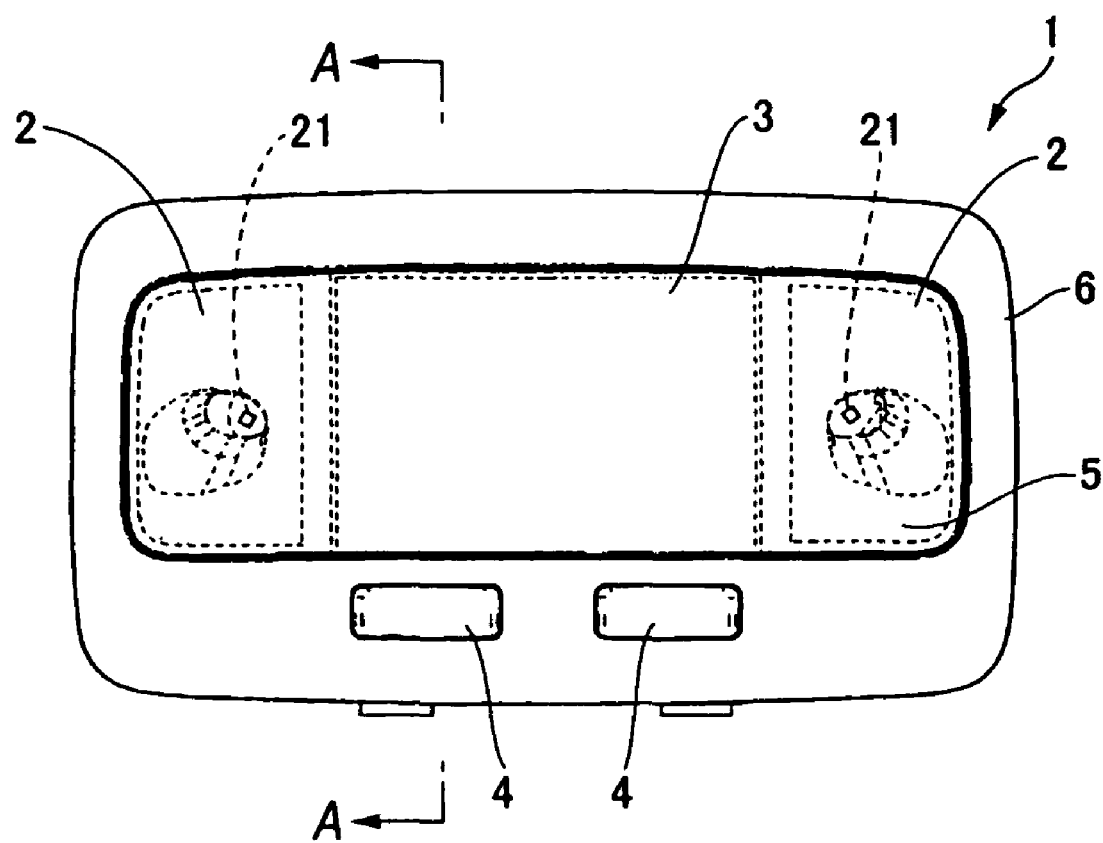
FIG. 1 is a view of a lighting device 1 seen from an interior side of a vehicle.

A light guide plate used in the present invention includes a light incident part in an end face and a light radiation part in a flat plate surface. When the material of the light guide plate is excellent in its light transmittance, the material is not especially limited. For instance, an acrylic resin, an epoxy resin and glass or the like may be employed. The size of the light guide plate may be determined by considering the size of a ceiling of an interior of a vehicle to which a lighting device of the present invention is attached, a quantity of required light, a light emitting area or the like. The light incident part ordinarily has a flat plate form, however, may have a recessed curved surface so as to cover a below-described light radiation side of opposed LED lamps, because an incident rate of light is improved.

In the present invention, a light source is provided that is opposed to the light incident part of the light guide plate. Since an LED lamp is smaller and lower in its quantity of heat generation and consumed electric power than a bulb lamp, the light source preferably includes a plurality of LED lamps and a light source base plate on which the LED lamps are mounted. The kind of the LED lamp is not especially limited, and the LED lamp such as a surface mount type or a shell type may be employed. The LED lamp of the surface mount type is preferably used among them. Since the LED lamp of the surface mount type has a wide directive angle, the light of the LED lamp is liable to be mixed with the lights of the adjacent LED lamps. A part of the plurality of the LED lamps may be a different kind from the kinds of other LED lamps. For instance, the LED lamps of the surface mount types and the LED lamps of the shell types are arranged in prescribed order so that the mixture of the lights is accelerated by the LED lamps of the surface mount types having the wide directive angles and the lights may be allowed to reach to remote positions by the LED lamps of the shell types having the narrow directive angles. The color of emitted light of the LED lamp is not especially limited to a specific color and may be a white color a daylight white color.

When the plurality of LED lamps are used, the plurality of LED lamps are mounted on the light source base plate so as to be arranged and opposed to the light incident part of the light guide plate. Since the end face in which the light incident part of the light guide plate is provided is ordinarily linear, the LED lamps are linearly arranged along the end face. Intervals at which the LED lamps are arranged are not especially limited and may be determined by considering a quantity of required light and the size of a light emitting part or the like.

A light shield member covers an area near the light incident part of a flat plate surface of the light guide plate. The light shield member may be formed by sticking a sheet or a film having light shield characteristics or applying a light shielding paint. The light shield member is provided with a prescribed width from a side end surface of the light incident part of the flat plate surface of the light guide plate. Since a large quantity of light reaches to the area near the light incident part of the light guide plate, when the area is used as a light emitting area (the light radiation part), the luminance of the area is excessively higher than that of other area. Thus, a luminance balance is not good as a whole. However, when such a light shield member is provided, since the area near the light incident part is not used as the light emitting area, an entire luminance balance is good. A surface of the light shield member opposed to the light guide plate is used as a reflection surface, the lights reaching to the area near the light incident part may be further guided to the light guide plate and radiated from the light emitting area remote from the light incident part. Thus, a quantity of emitted light is increased as a whole.

A switch part used in the present invention includes a switch main body, a switch knob and a pressing member connected to the switch knob to press the switch main body by pressing down the switch knob. The switch main body may be a tact switch or a lock type switch (an input type switch). For instance, a tact switch directly mounted on a control base board may be used as the switch main body of the present invention. The switch knob has a part of an interior side of a vehicle exposed to the interior side of the vehicle so that a person riding on the vehicle may press down it. As a form of the switch knob, may be used a push type in which an entire part of the switch knob slides in a pressing down direction, or a cantilever type in which an end part of the switch knob in the central side of the light guide plate is set to a fixed and an opposite side is set to a free end to bend the fixed end side and press down the free end side. When the switch knob is the push type, a switch holder is preferably provided that includes a guide rail holding the switch knob so as to slide in the pressing down direction, because the sliding operation of the switch knob is stabilized and the maneuverability of the switch knob is improved. When the switch knob is the cantilever type, the switch knob is preferably formed integrally so that the fixed end of the switch knob is connected to a resin case or a resin housing of the lighting device of the present invention. In such a way, the fixed end side of the switch knob functions as an integral hinge. Thus, the switch knob is effectively pressed down and the number of parts is reduced.

The switch part is arranged in such a way as described below. Namely, the switch part is arranged in such a way that an end part of the switch knob opposed to the center of the flat plate surface of the light guide plate is located on the light shield member, and the end face having the light incident part of the light guide plate is located between a first virtual line passing the end part of the switch knob and perpendicular to the flat plate surface of the light guide plate and a second virtual line passing the center of the switch main body and perpendicular to the flat plate surface of the light guide plate. That is, the end part of the switch knob covers the area near the light incident part of the light shield member and the switch main body is not arranged within an area where the end part of the switch knob is overlapped on the light shield member, but arranged outside the light guide plate in plan view. The light source base plate is preferably located between the end face of the light guide plate and the second virtual line, because a space in the lighting device can be effectively utilized and the device can be made to be compact and thin. Now, an embodiment of the present invention will be described below in detail.

First Embodiment

Figure 2:
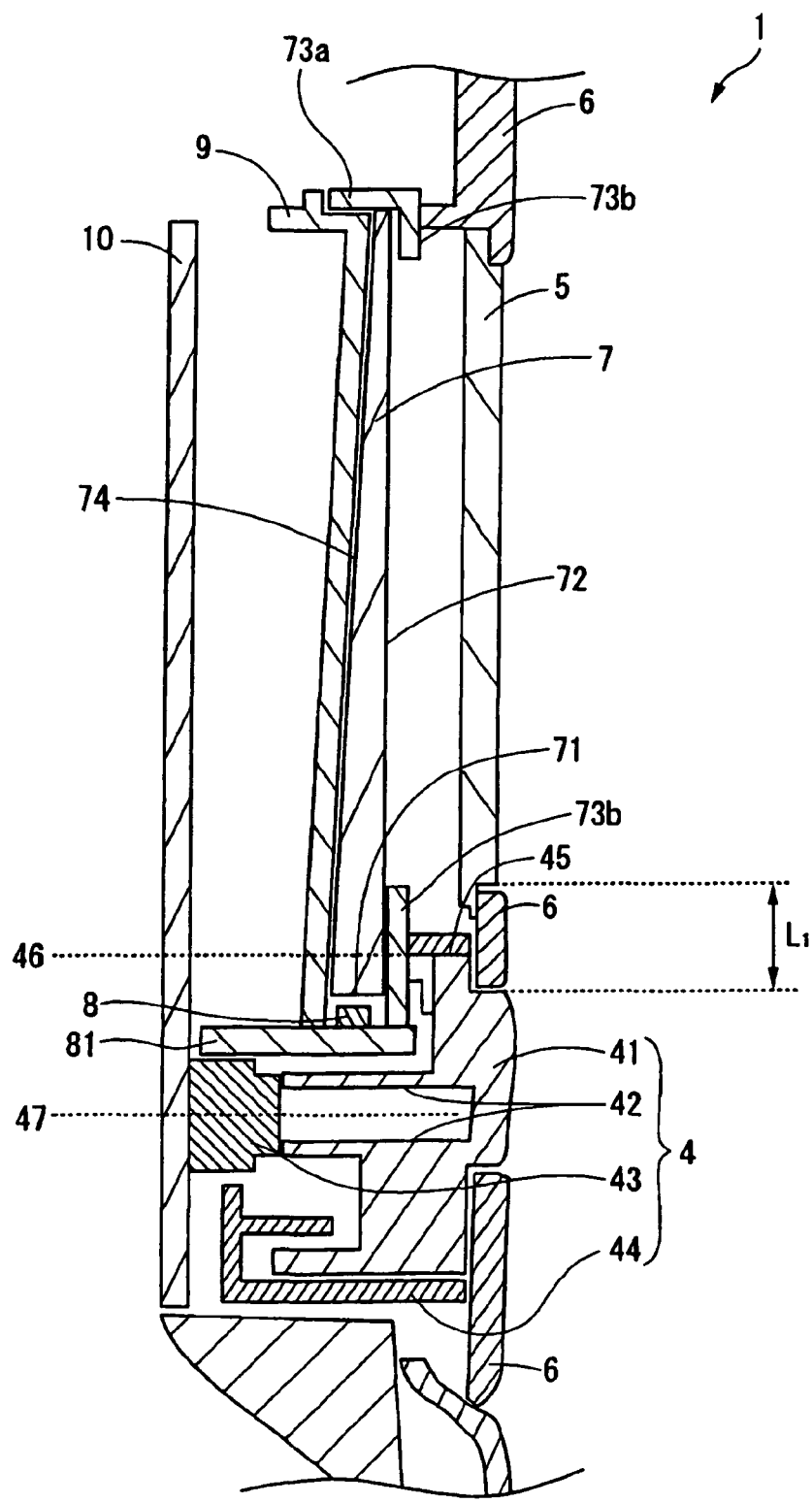
FIG. 2 is a sectional view taken along a line A-A of FIG. 1.

FIG. 1 shows a front view of a lighting device 1 of an embodiment of the present invention seen from an interior side of a vehicle. The lighting device 1 roughly includes map lamp light emitting parts 2 provided at two right and left parts, a room lamp light emitting part 3 provided in a center, two switch parts 4 provided in the vicinity of the room lamp light emitting part 3, an outer lens 5 for covering the map lamp light emitting parts 2 and the room lamp light emitting part 3 together and a vessel 6. FIG. 2 shows a sectional view taken along a line A-A of FIG. 1. The lighting device 1 further includes a light guide plate 7, LED lamps 8, a light source base plate 81, a housing 9 and a control base board 10. The light guide plate 7 is provided inside the room lamp light emitting part 3. The light guide plate 7 is made of an acrylic resin, has a rectangular flat plate form in plan view and is mounted on the housing 9. The light guide plate 7 has a light incident part 71 formed in an end face in the switch part 4 side and a light radiation part 72 in a flat plate surface in the outer lens 5 side. A micro-lens machining process as a light reflection process is applied to a surface opposite to the light radiation part 72 to form a reflection surface 74. As the light reflection process, a white color painting may be used as well as a reflection lens machining process such as the micro-lens machining process. The reflection surface 74 has a tapered surface that comes closer to the light radiation part 72 as the reflection surface 74 is separated more from the light incident part 71. The LED lamps 8 are opposed to the light incident part 71. The LED lamps 8 are linearly arranged along the longitudinal direction of the light incident part 71. The LED lamps 8 include six white color LED lamps and five amber color LED lamps. The white color LED lamp is a white color light emitting LED lamp including a blue color light emitting LED chip and an yellow color fluorescent material as a seal member. The light source base plate 81 is electrically connected to the control base board 10. The lighting state of the LED lamps 8 is controlled in accordance with the opening and closing state of a vehicle door (not shown in the drawing) through the control base board 10. An edge part of the light guide plate 7 is covered with a light shield member 73. The light shield member 73 is a frame shaped and includes a side surface light shield part 73a that covers an end face excluding an end face in which the light incident part 71 is provided and a frame shaped front surface light shield part 73b that covers a surface of the light guide plate 7 in the interior side of the vehicle. The front surface light shield part 73b covers an area near the light incident part 71 of the light guide plate 71 in the side surface of the interior of the vehicle.

The switch part 4 includes a switch knob 41, a pressing part 42, a switch main body 43 and a switch holder 44. In the switch knob 41, a rectangular area provided in an upper surface is exposed to the interior side of the vehicle. As shown in FIG. 2, a virtual line passing an end part 45 of the switch knob 41 in the central side of the light guide plate 7 and perpendicular to the flat plate surface of the light guide plate 7 is designated by a reference numeral 46. The end part of the switch knob 41 in the central side of the light guide plate 7 is located on the light shield part 73. That is, the virtual line 46 intersects the light shield member 73. The pressing member 42 is formed integrally with the switch knob 41 and provided in the center of a back surface (a surface of a ceiling side of the vehicle) of the switch knob 41. The pressing member 42 has a hollow shaft form substantially perpendicular to the back surface of the switch knob 41.

In a lower end of the pressing part 42, the switch main body 43 is provided, as virtual line passing the center of the switch main body 43 and perpendicular to the flat plate surface of the light guide plate 7 is designated by a reference numeral 47. As shown in FIG. 2, the light incident part 71 is located between the virtual line 46 and the virtual line 47. The switch main body 43 is a tact type switch, mounted on the control base board 10, pressed by the pressing part 42 and controlled to be turned on and off. The switch main body 43 is electrically connected to a light source part of the below-described map lamp light emitting part 3 through the control base board 10 and the lighting state of the map lamp light emitting part 3 is controlled by the switch part 4.

Figure 3:
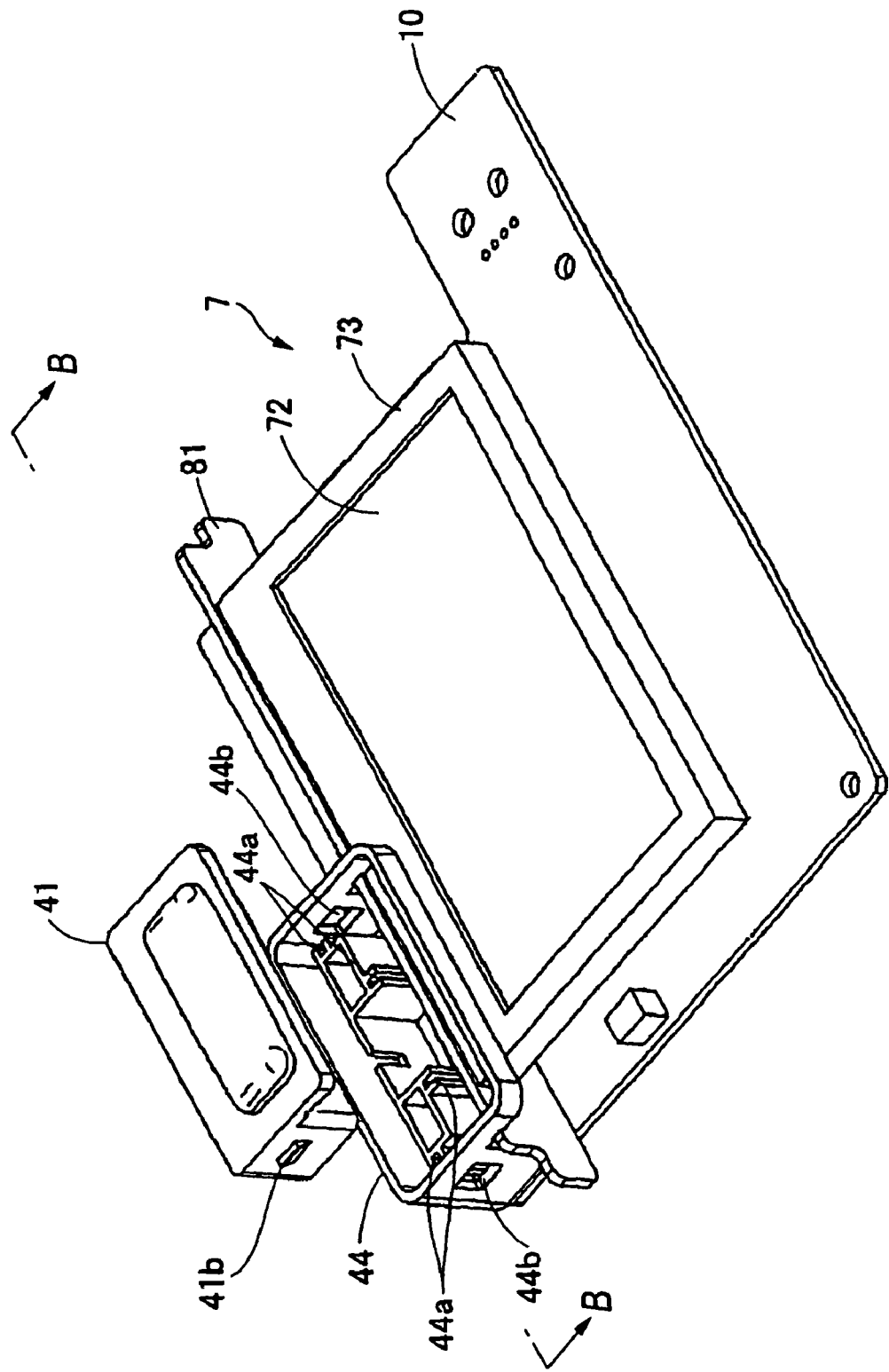
FIG. 3 is a partly exploded perspective view.
Figure 4:
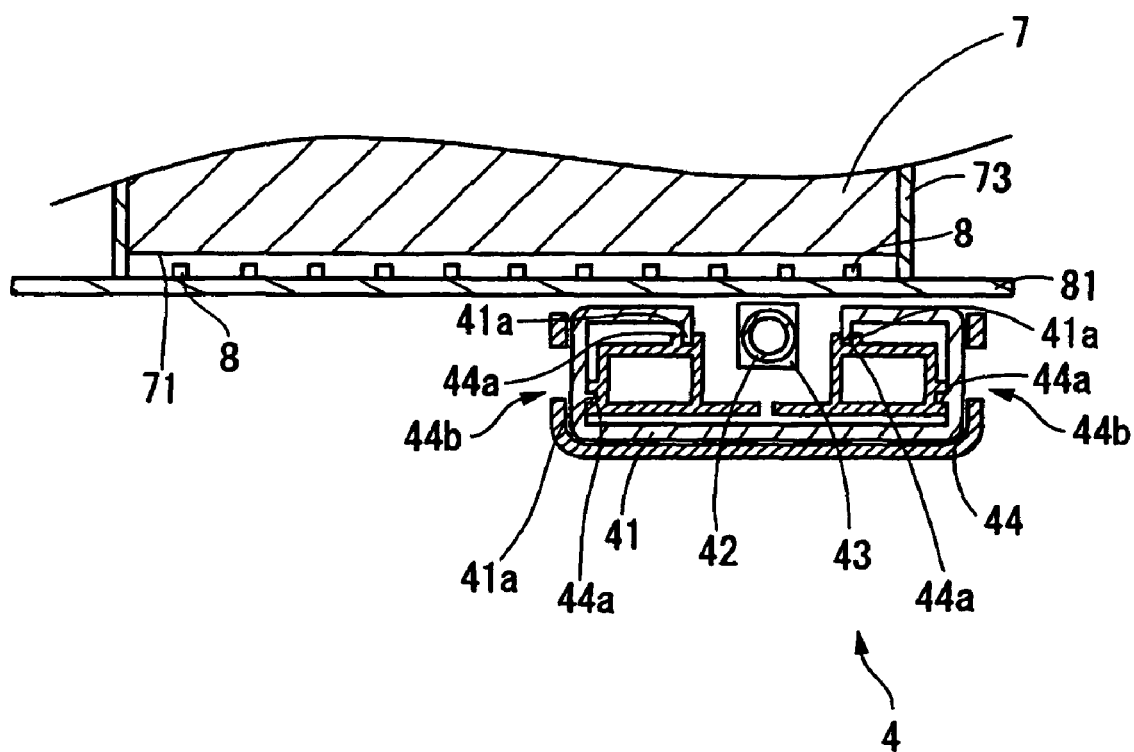
FIG. 4 is a sectional view taken along a line B-B of FIG. 3.

The switch knob 41 is held by the switch holder 44 so as to freely slide. FIG. 3 shows a partly exploded perspective view in which the switch knob 41, the switch holder 44, the light source base plate 81, the light guide plate 7 and the light shield member 73 are taken out. The two switch parts 4 are provided, however, the switch part 4 in the left side of a sheet surface in FIG. 1 will be omitted. As shown in FIG. 3, the switch holder 44 is frame shaped substantially along an outer surface of the switch knob 41 and includes engaging holes 44b in side surfaces. In the switch holder 44, four guide parts 44a are provided. The guide parts 44a are grooves parallel to the axial direction of the pressing part 42. On the other hand, on side surfaces of the switch knob 41, engaging protrusions 41b are provided. FIG. 4 shows a sectional view taken along a line B-B of FIG. 3. As shown in FIG. 4, the switch knob 41 includes four ribs 41a therein. The ribs 41a are provided in parallel with the axial direction of the pressing part 42. The width of the rib 41a is slightly smaller than the width of the groove of the guide part 44a of the switch holder 44. The engaging protrusions 41b of the switch knob 41 are engaged with the engaging holes 44b of the switch holder 44 and the ribs 41a are respectively fitted to the guide parts 44a. Thus, the switch knob 41 is held relative to the switch holder 44 so as to freely slide in the axial direction of the pressing part 42 (see FIG. 3 and FIG. 4). Thus, when the switch knob 41 is pressed down, the pressing part 42 presses the switch main body 43 to transmit a turning on/off signal from the switch main body 43. As shown in FIG. 4, the light source base plate 81 is arranged between the switch part 4 and the light guide plate 7.

Inside the right and left map lamp light emitting parts 2, LED lamps 21 are respectively provided. The LED lamps 21 are electrically connected to the control base board 10 and the lighting state of the LED lamps is controlled by the switch part 4.

Now, a lighting form of the lighting device 1 will be described below. Initially, the lighting form of the room lamp light emitting part 3 will be described below. When the vehicle door is opened, the LED lamps 8 are turned on in accordance therewith. The lights of the LED lamps 8 are incident on the light guide plate 7 from the light incident part and are guided to the light guide plate 7. The guided lights are reflected on the back surface of the light guide plate 7 and radiated to the interior side of the vehicle from the light radiation part 72. Since the lights radiated from the light radiation part 72 form a planar light, the lights widely illuminate the interior of the vehicle. On the other hand, the light shield member 73 is provided in the light guide plate 7, so that the lights are not radiated from parts near the LED lamps 8. Since a large quantity of light reaches to an area near the LED lamps 8, when this area is used as the light radiation part, the area excessively emits light. However, such an excessive light emission is prevented by the light shield member 73 to reduce unevenness in luminance as a whole and improve an outward appearance. Further, since a part of the lights of the area near the LED lamps 8 is reflected by the light shield member 73 and guided again to the light guide plate 7 to become a light radiated from the light radiation part 72, the utilization factor of the light is improved.

The end part 45 of the switch knob 41 in the central side of the light guide plate 7 is located on the light shield plate 73. As shown in FIG. 2, in such an arrangement, a distance L1 between the switch part 4 and the room lamp light emitting part 3 which is observed externally is shorter than that of a usual device. Thus, dullness is not given to an observer and an outward appearance is improved. On the other hand, the switch main body 43 is not located on the light guide plate 7. Thus, an entire part of the switch part 4 may be formed to be thinner than a case that the entire part of the switch part 4 is arranged on the light shield member 73. Further, the light source base plate 81 is located between the light incident part 71 and the virtual line 47. Thus, a space in the lighting device 1 is effectively used and the device may be made to be compact.

The ribs 41a of the switch knob 41 are fitted to the guide parts 44a of the switch holder 44 so that the switch knob 41 is held by the switch holder 44 so as to freely slide in the pressing down direction. Thus, the switch knob 41 may be smoothly pressed down and maneuverability is good. Further, the pressing part 42 is provided at the center of the back surface of the switch knob 41. Thus, since a force at the time of pressing down the switch knob 41 is efficiently transmitted to the pressing part 42, the switch knob 41 is easily pressed down.

Second Embodiment

Figure 5:
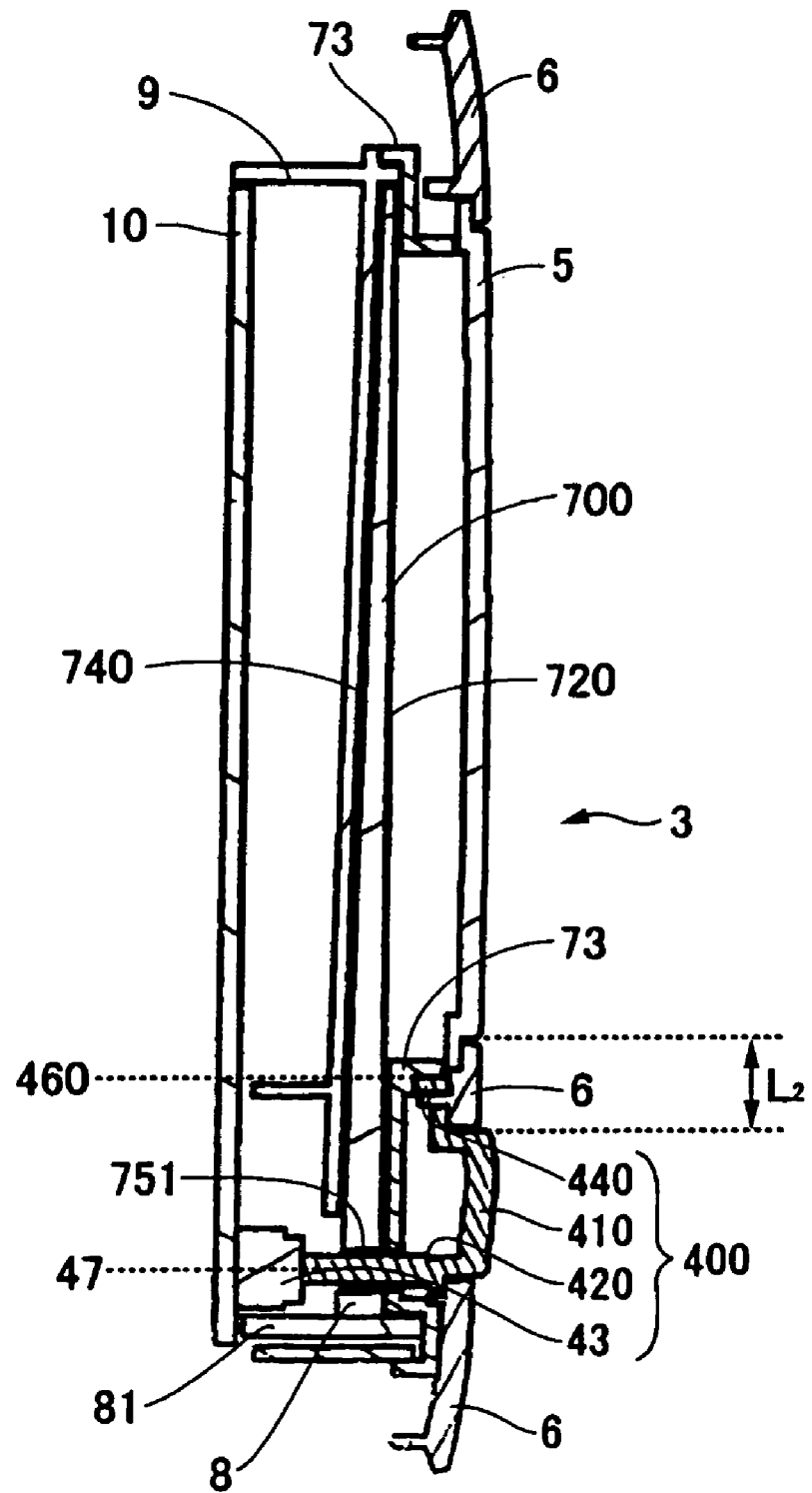
FIG. 5 is a longitudinal end view of a lighting device 100.

FIG. 5 shows a longitudinal end face view of a lighting device 100 as another embodiment of the present invention. The same members as those of the lighting device 1 are designated by the same reference numerals and an explanation thereof will be omitted.

Figure 6:
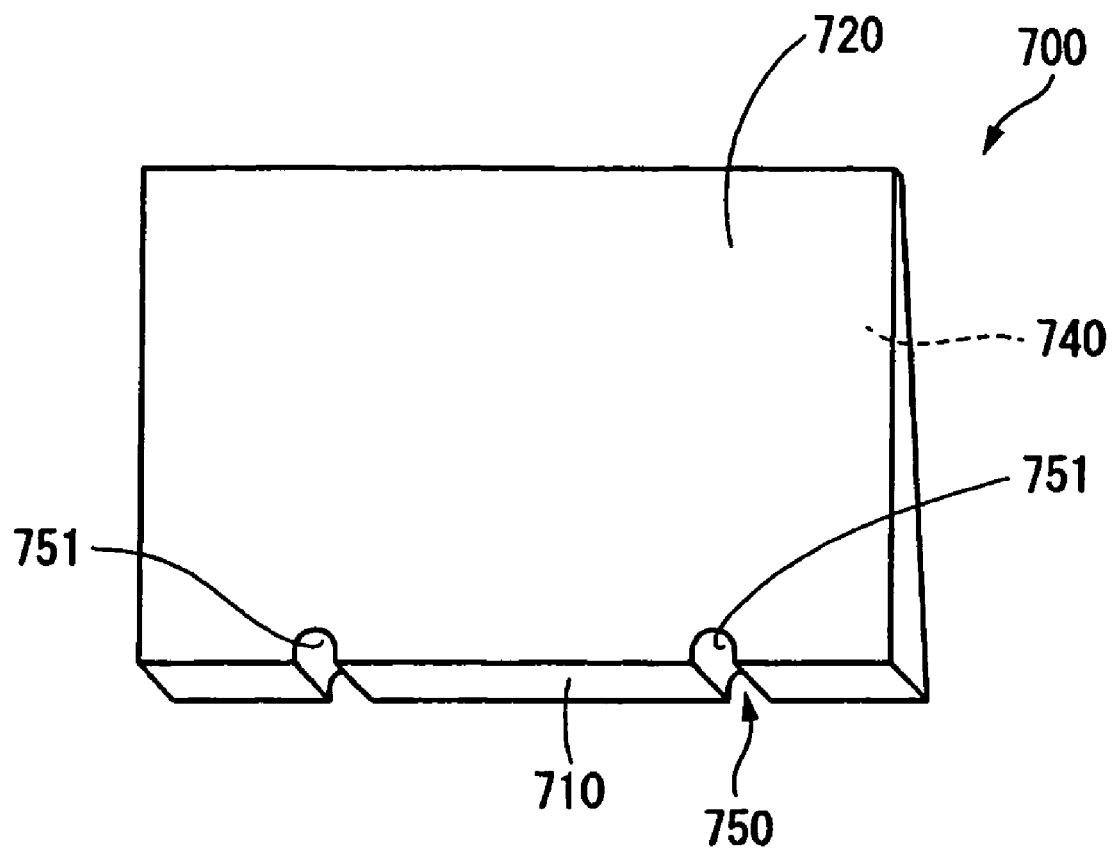
FIG. 6 is a perspective view of a light guide plate 700.

The lighting device 100 includes a light guide plate 700 and a switch part 400. The light guide plate 700 is an acrylic flat plate. FIG. 6 shows a perspective view of the light guide plate 700. The light guide plate 700 includes a light incident part 710 and recessed parts 750 in one end and a light radiation part 720 on a flat plate surface in an outer lens 5 side. A wall surface of the recessed part 750 is designated by reference numeral 751. A back surface (a surface opposite to the outer lens 5) is tapered from one end to the other end and forms a reflection surface to which a micro-lens machining process is applied.

The switch part 400 includes, as shown in FIG. 5, a switch knob 410, a pressing part 420, a switch main body 43 and a fixed end part 440. The fixed end part 440 is provided in an end part of the switch knob 410 in the central side of the light guide plate 700 and located on a light shield member 73. Namely, a virtual line 460 passing the fixed end part 440 and perpendicular to the flat plate surface of the light guide plate 700 intersects the light shied member 73. The switch knob 410 is sandwiched between the light shield member 73 and a vessel 6 in the fixed end part 440. The pressing part 420 is provided in an end part opposite to the fixed end part 440 of the switch knob 410 (that is, a lower edge side of the lighting device 100) and located in the recessed part 750 of the light guide plate 700. In a lower end of the pressing part 420, the switch main body 43 is provided. In such an arrangement, between the virtual line 460 and a virtual line 47, the wall surface 751 (a part of the end face of the light guide plate 700) of the recessed part 750 is located.

The switch knob 410 has a cantilever structure in which the pressing part 420 side is not fixed and the fixed end 440 is fixed. Accordingly, when the switch knob 410 is pressed down, the fixed end 440 side is bent to press the pressing part 420 and press the switch main body 43 so that the switch is turned on/off.

As shown in FIG. 5, since the fixed end part 440 of the switch knob 410 is located on the light shield member 730, a distance L2 between the switch part 400 and a room lamp light emitting part 3 which is observed externally is shorter than that in a usual device like the lighting device 1. Thus, dullness is not given to an observer and an outward appearance is improved. Further, since the switch main body 43 is not located on the light guide plate 700, an entire part of the switch part 400 may be formed to be thinner than a case that the entire part of the switch part 400 is arranged on the light shield member 730 (that is, on the light guide plate 700).

The present invention is used as the lighting device of the interiors of various vehicles.

The present invention is not limited to the above-described embodiments and the explanation of the embodiments. The present invention includes various kinds of modified forms within a scope that may be easily thought of by a person with ordinary skill in the art without departing the description of claims.

The contents of theses, Japanese Patent laid-open publications and Japanese Patent publications stated in this specification are all referred to as quotations.

What is claimed is:

1. A lighting device, comprising: a light guide plate comprising a light incident part in an end face and a light radiation part perpendicular to the light incident part in a flat plate surface;
a light source part opposed to the light incident part;
a light shield member covering an area near the light incident part on the flat plate surface of the light guide plate and preventing the passage of light from the light source part; and
a switch part including a switch main body, a switch knob and a pressing member connected to the switch knob to press the switch main body by pressing down the switch knob,
wherein an end part of the switch knob opposed to a center of the flat plate surface of the light guide plate is located on the light shield member,
wherein the radiation part extends away from the end wall of the switch main body, such that light is emitted through an area adjacent to an end wall of the switch part,
and wherein the entire end face of the light guide plate is located between a first virtual line passing the end part of the switch knob and perpendicular to the flat plate surface of the light guide plate and a second virtual line passing a center of the switch main body and perpendicular to the flat plate surface of the light guide plate.

2. The lighting device according to claim 1, wherein the pressing member is connected to the center of the switch knob and provided in parallel with a pressing down direction of the switch.

3. The lighting device according to claim 1, wherein the switch part further includes a switch holder comprising a guide rail that holds the switch knob so as to slide in a pressing down direction.

4. The lighting device according to claim 1, wherein the light source part includes a plurality of light-emitting diode (LED) lamps arranged to be opposed to the light incident part and a light source base plate on which the plurality of LED lamps are arranged, and the light source base plate is located between the end face of the light guide plate and the second virtual line.

5. The lighting device according to claim 1, wherein the flat plate surface extends from the end face of the light incident part.

6. The lighting device according to claim 1, further comprising:
a light source base plate extending in a direction of the first and second virtual lines, the light source part being arranged on the light source base plate.

7. The lighting device according to claim 6, wherein an entirety of the light source base plate is located between the end face of the light guide plate and the second virtual line.

8. The lighting device according to claim 1, wherein the end face of the light incident part is located in a side of the light guide plate that is closer to the switch part than another end face of the light incident part that opposes the end face of the light incident part.

9. The lighting device according to claim 1, wherein the light source is located between the end face of the light incident part and the switch part.

10. The lighting device according to claim 1, further comprising:
an outer lens to emit light from the light guide plate,
wherein the flat plate surface opposes a surface of the outer lens.

11. The lighting device according to claim 1, further comprising:
a reflection surface disposed opposite to the light radiation part, the reflection surface extending from the end face of the light incident part.

12. The lighting device according to claim 11, wherein the reflection surface comprises a tapered surface that approaches the flat plate surface as the reflection surface extends away from the end face of the light incident part.

13. The lighting device according to claim 1, wherein a part of the flat plate surface is devoid of being covered by the light shield member.

14. The lighting device according to claim 1, wherein the light shield member ends in a lower portion of the flat plate surface.

15. A lighting device, comprising: light guide plate comprising a light incident part in an end surface and a light radiation part, comprising a flat plate surface that extends from the end surface of the light incident part, wherein the light radiation part is perpendicular to the light incident part;
a light source part opposed to the light incident part;
a light shield member covering an area of the flat plate surface that is located near the end surface of the light incident part and preventing light the passage of light from the light source part; and
a switch part including a switch main body, a switch knob, and a pressing member connected to the switch knob to press the switch main body by pressing the switch knob, wherein an end part of the switch knob, opposed to a center of the flat plate surface of the light guide plate, is located on the light shield member;
wherein the radiation part extends away from the end wall of the switch part, such that light is emitted through an area adjacent to the end wall of the switch part,
wherein the entire end surface of the light guide plate is located between a first virtual line passing the end part of the switch knob and perpendicular to the flat plate surface of the light guide plate and a second virtual line passing a center of the switch main body and perpendicular to the flat plate surface of the light guide plate.

16. The lighting device according to claim 15, further comprising:
a light source base plate extending in a direction of the first and second virtual lines, the light source part being arranged on the light source base plate,
wherein an entirety of the light source base plate is located between the end surface of the light guide plate and the second virtual line.

17. The lighting device according to claim 15, wherein the light shield member ends in a lower portion of the flat plate surface.

18. The lighting device according to claim 15, wherein the light source is located between the end surface of the light incident part and the switch part.

19. The lighting device according to claim 15, further comprising:
a reflection surface disposed opposite to the light radiation part, the reflection surface extending from the end surface of the light incident part,
wherein the reflection surface comprises a tapered surface that approaches the flat plate surface as the reflection surface extends away from the end surface of the light incident part.

* * * * *